US007809555B2

(12) United States Patent
Kim

(10) Patent No.: US 7,809,555 B2
(45) Date of Patent: Oct. 5, 2010

(54) SPEECH SIGNAL CLASSIFICATION SYSTEM AND METHOD

(75) Inventor: Hyun-Soo Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 867 days.

(21) Appl. No.: 11/725,588

(22) Filed: Mar. 19, 2007

(65) Prior Publication Data

US 2007/0225972 A1 Sep. 27, 2007

(30) Foreign Application Priority Data

Mar. 18, 2006 (KR) ..................... 10-2006-0025105

(51) Int. Cl.
*H04J 3/17* (2006.01)
*H04B 14/06* (2006.01)
*G06F 15/00* (2006.01)
*G10L 15/20* (2006.01)
*G10L 21/00* (2006.01)

(52) U.S. Cl. ....................... 704/208; 704/200; 704/201; 704/205; 704/226; 704/233; 370/435; 375/245

(58) Field of Classification Search ................. 704/201, 704/205, 208
See application file for complete search history.

(56) References Cited

U.S. PATENT DOCUMENTS 4,281,218 A * 7/1981 Chuang et al. .............. 370/435
5,007,093 A * 4/1991 Thomson .................... 704/214
5,568,514 A * 10/1996 McCree et al. .............. 375/245
5,806,038 A * 9/1998 Huang et al. ................ 704/268
5,867,815 A * 2/1999 Kondo et al. ................ 704/228
5,911,128 A * 6/1999 DeJaco .................... 704/200.1
6,088,670 A * 7/2000 Takada ....................... 704/233

(Continued)

FOREIGN PATENT DOCUMENTS

JP 09-160585 6/1997

(Continued)

*Primary Examiner*—David R Hudspeth
*Assistant Examiner*—Justin W Rider
(74) *Attorney, Agent, or Firm*—The Farrell Law Firm, LLP

(57) ABSTRACT

Provided is a speech signal classification system and method. The speech signal classification system includes a primary recognition unit for determining using characteristics extracted from a speech frame whether the speech frame is a voice sound, a non-voice sound, or background noise and a secondary recognition unit for determining using at least one other speech frame whether a determination-reserved speech frame is an non-voice sound or background noise, if it is determined according to a primary recognition result that an input speech frame is not a voice sound. The system reserves a determination of the input speech frame, stores characteristics of at least one other speech frame to determine the determination-reserved speech frame, calculates secondary statistical values from characteristics of the determination-reserved speech frame and the stored characteristics of the other speech frames, and determines using the calculated secondary statistical values whether the determination-reserved speech frame is an non-voice sound or background noise. Accordingly, if an input speech frame is not a voice sound, the input speech frame can be more accurately classified and output as an non-voice sound or background noise, and thus errors, which may be generated in determination of a signal corresponding to an non-voice sound, can be reduced.

18 Claims, 7 Drawing Sheets

U.S. PATENT DOCUMENTS

| | | | | |
|---|---|---|---|---|
| 6,188,981 | B1 * | 2/2001 | Benyassine et al. | 704/233 |
| 7,117,150 | B2 * | 10/2006 | Murashima | 704/233 |
| 2003/0101048 | A1 * | 5/2003 | Liu | 704/208 |

FOREIGN PATENT DOCUMENTS

| | | |
|---|---|---|
| JP | 10-222194 | 8/1998 |
| JP | 11-119796 | 4/1999 |
| KR | 1020020057701 | 7/2002 |
| KR | 1020040079773 | 9/2004 |

* cited by examiner

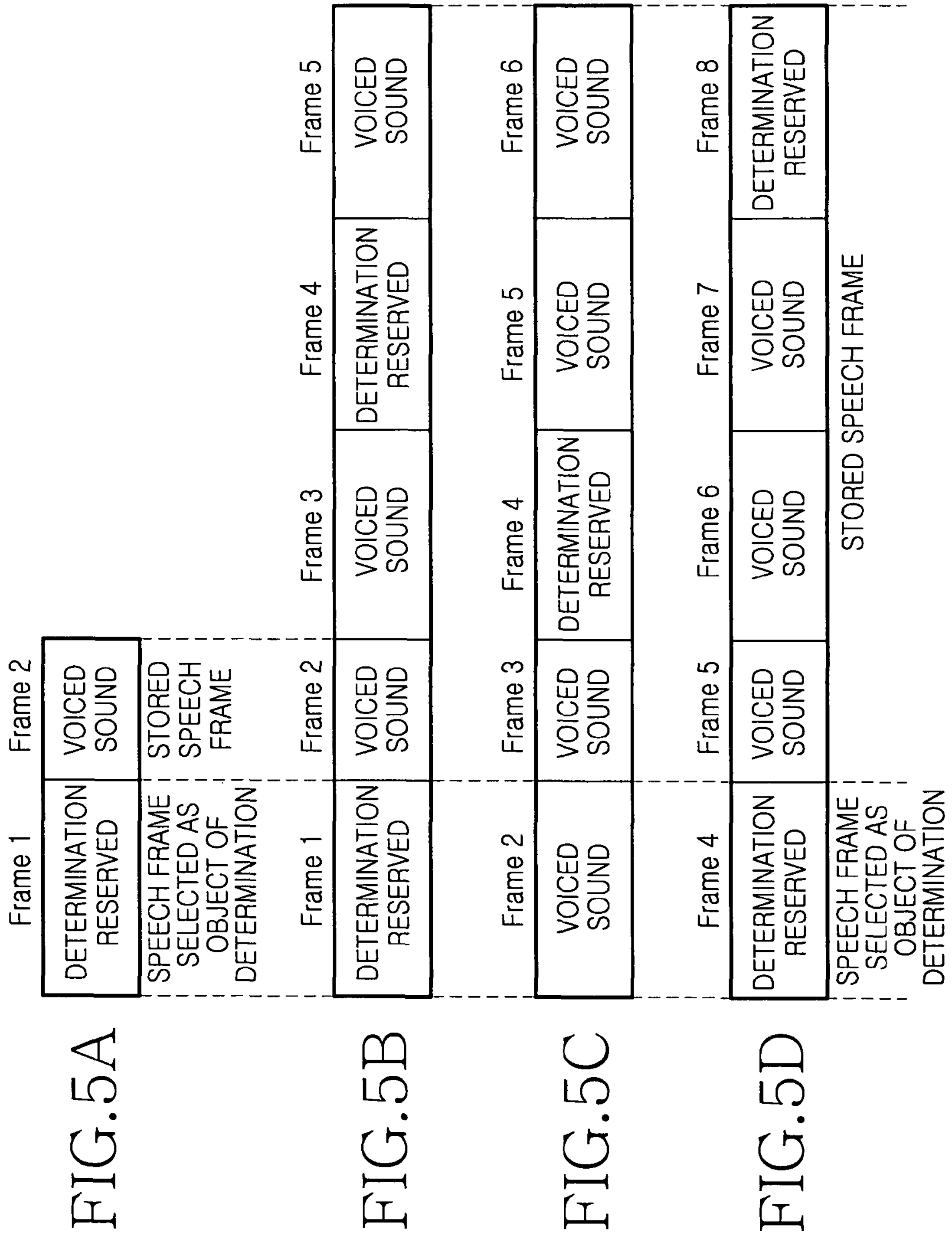
FIG.5A
Frame 1
DETERMINATION RESERVED
Frame 2
VOICED SOUND
SPEECH FRAME SELECTED AS OBJECT OF DETERMINATION
STORED SPEECH FRAME
FIG.5B
Frame 1
DETERMINATION RESERVED
Frame 2
VOICED SOUND
Frame 3
VOICED SOUND
Frame 4
DETERMINATION RESERVED
Frame 5
VOICED SOUND
FIG.5C
Frame 2
VOICED SOUND
Frame 3
VOICED SOUND
Frame 4
DETERMINATION RESERVED
Frame 5
VOICED SOUND
Frame 6
VOICED SOUND
FIG.5D
Frame 4
DETERMINATION RESERVED
Frame 5
VOICED SOUND
Frame 6
VOICED SOUND
Frame 7
VOICED SOUND
Frame 8
DETERMINATION RESERVED
SPEECH FRAME SELECTED AS OBJECT OF DETERMINATION
STORED SPEECH FRAME

SPEECH SIGNAL CLASSIFICATION SYSTEM AND METHOD

PRIORITY

This application claims priority under 35 U.S.C. §119 to an application entitled "Speech Signal Classification System and Method" filed in the Korean Intellectual Property Office on Mar. 18, 2006 and assigned Serial No. 2006-25105, the contents of which are incorporated herein by reference.

BACKGROUND OF THE INVENTION

1. Field of the Invention

The present invention relates generally to a speech signal classification system, and in particular, to a speech signal classification system and method to classify an input speech signal into a voice sound, a non-voice sound, and background noise based on a characteristic of a speech frame of the speech signal.

2. Description of the Related Art

In general, a speech signal classification system is used during the pre-processing of an input speech signal that is recognized as a specific character and used to determine if the input speech signal is a voice sound, a non-voice sound, or background noise. The background noise is noise having no recognizable meaning in speech recognition, that is, background noise is neither a voice sound nor a non-voice sound.

The classification of a speech signal is important in order to recognize subsequent speech signals since a recognizable character type of the subsequent speech signals depends on whether the speech signal is a voice sound or a non-voice sound. The classification of a speech signal as a voice sound or a non-voice sound is basic and important in all kinds of speech recognition, audio signal processing systems, e.g., signal processing systems performing coding, synthesis, recognition, and enhancement.

In order to classify an input speech signal as a voice sound, a non-voice sound, or background noise, various characteristics extracted from a resulting signal obtained by converting the speech signal to a speech signal in a frequency domain are used. For example, some of the characteristics are a periodic characteristic of harmonics, Root Mean Squared Energy (RMSE) of a low band speech signal, and a Zero-crossing Count (ZC). A conventional speech signal classification system extracts various characteristics from an input speech signal, weights the extracted characteristics using a recognition unit comprised of neural networks, and according to a value obtained by calculating the weighted characteristics recognizes whether the input speech signal is a voice sound, a non-voice sound, or background noise. The input speech signal is classified according to the recognition result and output.

FIG. 1 is a block diagram of a conventional speech signal classification system.

Referring to FIG. 1, the conventional speech signal classification system includes a speech frame input unit 100 for generating a speech frame by converting an input speech signal, a characteristic extractor 102 for receiving the speech frame and extracting pre-set characteristics, a recognition unit 104, a determiner 106 for determining according to the extracted characteristics whether the speech frame corresponds to a voice sound, a non-voice sound, or background noise, and a classification & output unit 108 for classifying and outputting the speech frame according to the determination result.

The speech frame input unit 100 converts the speech signal to a speech frame by transforming the speech signal to a speech signal in the frequency domain using a fast Fourier transform (FFT) method. The characteristic extractor 102 receives the speech frame from the speech frame input unit 100, extracts characteristics, such as a periodic characteristic of harmonics, RMSE of a low band speech signal, and a ZC, from the speech frame, and outputs the extracted characteristics to the recognition unit 104. In general, the recognition unit 104 is comprised of a neural network. Since the neural network is useful in analyzing complicated problems which are nonlinear, i.e., cannot be mathematically solved, due to its attributes, the neural network is suitable for determining according to an analysis result whether an input speech signal is a voice sound, a non-voice sound, or background noise. The recognition unit 104 is comprised of the neural network and grants pre-set weights to the characteristics input from the characteristic extractor 102 and derives a recognition result through a neural network calculation process. The recognition result is a result obtained by calculating computation elements of the speech frame according to the weights granted to the characteristics of the speech frame, i.e., a calculation value.

The determiner 106 determines, according to the recognition result, i.e., the value calculated by the recognition unit 104, whether the input speech signal is a voice sound, a non-voice sound, or background noise. The classification & output unit 108 outputs the speech frame as a voice sound, a non-voice sound, or background noise according to a determination result of the determiner 106.

In general, for a voice sound, since various characteristics extracted by the characteristic extractor 102 are clearly different from those of a non-voice sound or background noise, it is relatively easy to distinguish a voice sound from a non-voice sound or background noise. However, a non-voice sound is not clearly distinguishable from background noise.

For example, a voice sound has a periodic characteristic in which harmonics appear repeatedly within a predetermined period, background noise does not have such a characteristic related to harmonics, and a non-voice sound has harmonics with weak periodicity. In other words, a voice sound has a characteristic in which harmonics are repeated even in a single frame, whereas a non-voice sound has a weak periodic characteristic in which harmonics appear but the periodicity of the harmonics, one characteristic of a voice sound, occurs over several frames.

Thus, in the conventional speech signal classification system, since an input single speech frame is determined using characteristics extracted from the single speech frame, when a voice sound is determined, high accuracy is maintained. However, if the input single speech frame is not a voice sound, the accuracy is significantly decreased to classify the input single speech frame as a non-voice sound or background noise.

SUMMARY OF THE INVENTION

An object of the present invention is to substantially solve at least the above problems and/or disadvantages and to provide at least the advantages below. Accordingly, an object of the present invention is to provide a speech signal classification system and method to more accurately classify a speech frame, which has not been determined as a voice sound, as a non-voice sound or background noise.

According to one aspect of the present invention, there is provided a speech signal classification system that includes a speech frame input unit for generating a speech frame by converting a speech signal of a time domain to a speech signal of a frequency domain; a characteristic extractor for extracting characteristic information from the generated speech frame; a primary recognition unit for performing primary recognition using the extracted characteristic information to derive a primary recognition result to be used to determine if the speech frame is a voice sound, an non-voice sound, or background noise; a memory unit for storing characteristic information extracted from the speech frame and at least one other speech frame; a secondary statistical value calculator for calculating secondary statistical values using the stored characteristic information; a secondary recognition unit for performing secondary recognition using the determination result of the speech frame according to the primary recognition result and the secondary statistical values to derive a secondary recognition result to be used to determine if the speech frame is an non-voice sound or background noise; a controller for determining if the speech frame is a voice sound based on the primary recognition result, and if it is determined that the speech frame is not a voice sound, storing the characteristic information of the speech frame and at least one other speech frame, calculating the secondary statistical values using the stored characteristic information, performing the secondary recognition using the determination result of the speech frame based on the primary recognition result and the secondary statistical values, and determining if the speech frame is a non-voice sound or background noise based on the secondary recognition result; and a classification and output unit for classifying and outputting the speech frame as a voice sound, a non-voice sound, or background noise according to the determination results.

According to another aspect of the present invention, there is provided a speech signal classification method that includes performing primary recognition using characteristic information extracted from a speech frame to determine whether the speech frame is a voice sound, an non-voice sound, or background noise; if it is determined as a result of the primary recognition that the speech frame is not a voice sound, storing the determination result of the speech frame and characteristic information of the speech frame; storing characteristic information extracted from a pre-set number of other speech frames; calculating secondary statistical values based on the stored characteristic information of the speech frame and the other speech frames; performing secondary recognition using the determination result of the speech frame according to the primary recognition result and the secondary statistical values to determine whether the speech frame is an non-voice sound or background noise; and classifying and outputting the speech frame as an non-voice sound or background noise according to a result of the secondary recognition.

BRIEF DESCRIPTION OF THE DRAWINGS

The above and other objects, features and advantages of the present invention will become more apparent from the following detailed description when taken in conjunction with the accompanying drawing in which:

FIGS. 5A, 5B, 5C, and 5D illustrate characteristic information of speech frames, which is stored to perform recognition of a speech frame selected as a current object of determination, in a speech signal classification system according to the present invention;

DETAILED DESCRIPTION OF THE PREFERRED EMBODIMENT

Figure 1:
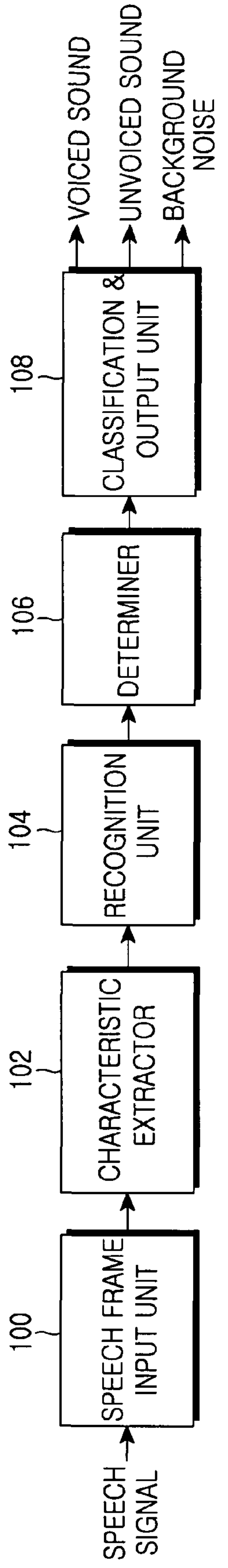
FIG.1 (PRIOR ART)
FIG. 1 is a block diagram of a conventional speech signal classification system.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The main principles will now be first described to fully understand the present invention. In the present invention, a speech signal classification system includes a primary recognition unit for determining from characteristics extracted from a speech frame whether the speech frame is a voice sound, an non-voice sound, or background noise, and a secondary recognition unit for determining, using at least one speech frame, whether a determination-reserved speech frame is an non-voice sound or background noise. If it is determined from a primary recognition result that an input speech frame is not a voice sound, the speech signal classification system reserves determination of the input speech frame and stores characteristics of at least one speech frame to perform a determination of the determination-reserved speech frame. The speech signal classification system calculates secondary statistical values from characteristics of the determination-reserved speech frame and the stored characteristics of the speech frames and determines, using the calculated secondary statistical values, whether the determination-reserved speech frame is an non-voice sound or background noise. Thus, in the present invention, even if an input speech frame is not a voice sound, the input speech frame can be correctly determined and classified as a non-voice sound or background noise, and thereby errors, which may be generated during the determination of a signal corresponding to a non-voice sound, can be reduced.

Figure 2:
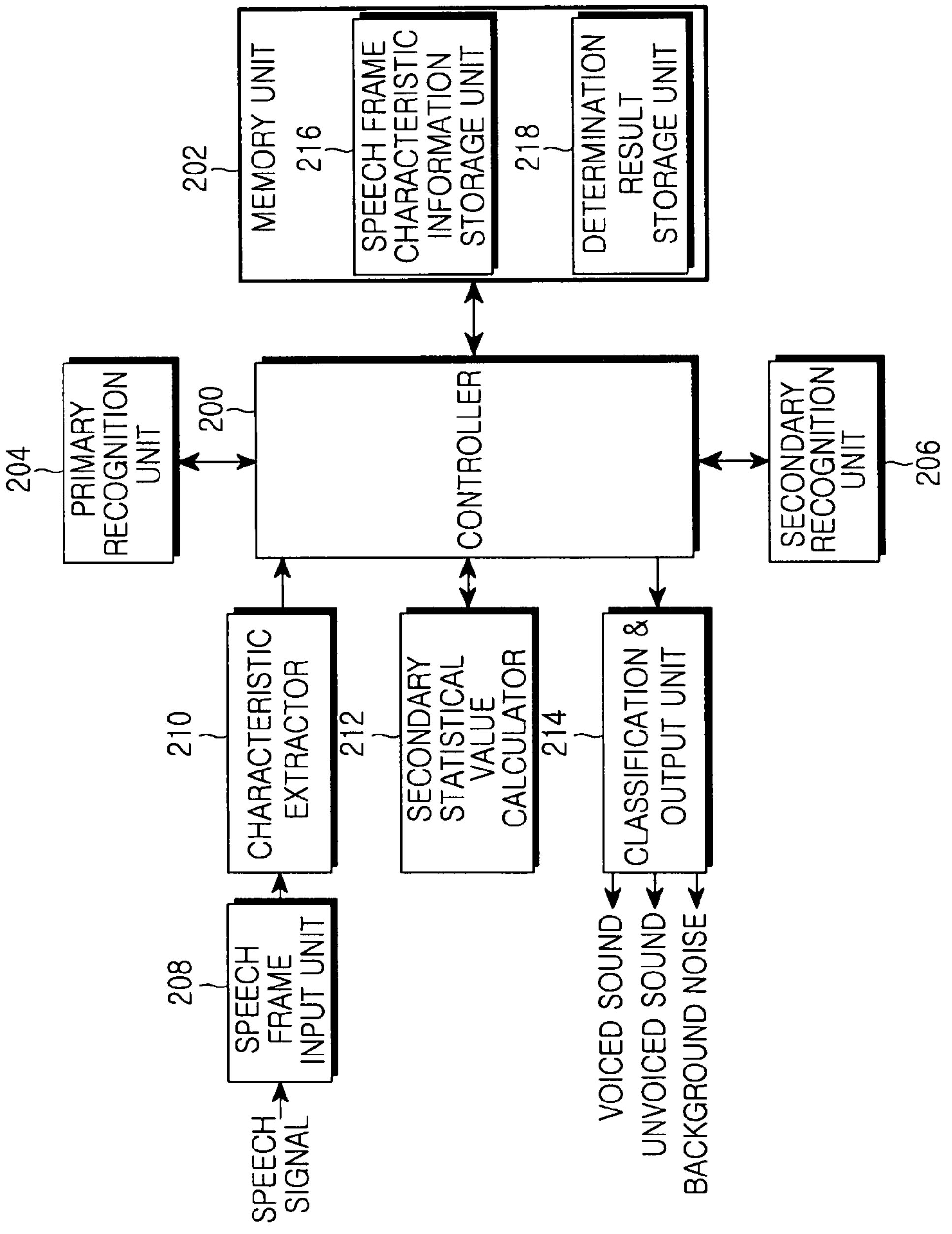
FIG. 2 is a block diagram of a speech signal classification system according to the present invention.

FIG. 2 is a block diagram of a speech signal classification system according to the present invention.

Referring to FIG. 2, the speech signal classification system includes a speech frame input unit 208, a characteristic extractor 210, a primary recognition unit 204, a secondary statistical value calculator 212, a secondary recognition unit 206, a classification and output unit 214, a memory unit 202, and a controller 200.

If a speech signal is input, the speech frame input unit 208 converts the input speech signal to a speech frame by transforming the speech signal to a speech signal in the frequency domain using a transforming method such as an FFT. The characteristic extractor 210 receives the speech frame from the speech frame input unit 208 and extracts pre-set speech frame characteristics from the speech frame. Examples of the extracted characteristics are a periodic characteristic of harmonics, RMSE of a low band speech signal, and a ZC.

The controller 200 is connected to the characteristic extractor 210, the primary recognition unit 204, the secondary statistical value calculator 212, the secondary recognition unit 206, the classification and output unit 214, and the memory unit 202. When the characteristics of the speech frame are extracted by the characteristic extractor 210, the controller 200 inputs the extracted characteristics to the primary recognition unit 204 and determines, according to a result calculated by the primary recognition unit 204, whether the speech frame is a voice sound, an non-voice sound, or background noise. If it is determined that the speech frame is not a voice sound, i.e., if it is determined from the primary recognition result that the speech frame is an non-voice sound or background noise, the controller 200 stores the primary recognition result calculated by the primary recognition unit 204 and reserves determination of the speech frame. In addition, the controller 200 stores the characteristics extracted from the speech frame.

The controller 200 also stores characteristics extracted from at least one speech frame input after the determination-reserved speech frame on the basis of speech frames in order to classify the determination-reserved speech frame as an non-voice sound or background noise and calculates at least one secondary statistical value from each of the characteristics of the determination-reserved speech frame and the stored characteristics of the speech frames. The secondary statistical values are statistical values of the characteristics extracted by the characteristic extractor 210. However, since the characteristics, e.g., the RMSE (a total sum of energy amplitudes of the speech signal) and the ZC (the total number of zero crossings in the speech frame), extracted by the characteristic extractor 210 are in general statistical values based on an analysis result of the speech frame, statistical values of characteristics of at least one speech frame are referred to as secondary statistical values.

The secondary statistical values can be calculated on the basis of each of the characteristics of the determination-reserved speech frame and the speech frames, which are stored to perform recognition of the determination-reserved speech frame. Equation (1) illustrates an RMSE ratio, which is a secondary statistical value calculated from RMSE of the determination-reserved speech frame (a current frame) and RMSE of a speech frame that is stored to perform recognition of the determination-reserved speech frame (a stored frame) among the characteristics. Equation (2) illustrates a ZC ratio, which is a secondary statistical value calculated from a ZC of the determination-reserved speech frame (a current frame) and a ZC of a speech frame that is stored to perform recognition of the determination-reserved speech frame (a stored frame) among the characteristics.

$$RMSE\text{ Ratio} = \frac{\text{Current Frame } RMSE}{\text{Stored Frame } RMSE} \tag{1}$$

$$ZC\text{ Ratio} = \frac{\text{Current Frame } ZC}{\text{Stored Frame } ZC} \tag{2}$$

The RMSE ratio can be a ratio of an energy amplitude of the determination-reserved speech frame, i.e., a speech frame selected as a current object of determination, to an energy amplitude of another stored speech frame. In addition, the ZC ratio can be a ratio of a ZC of the speech frame selected as the current object of determination to a ZC of another stored speech frame. If the speech frame selected as the current object of determination is not a voice sound, whether characteristics of a voice sound (e.g., periodicity of harmonics) appear in the speech frame selected as the current object of determination among at least two speech frames can be determined using the secondary statistical values.

Equations (1) and (2) illustrate a case where the speech signal classification system according to the present invention stores characteristics of a single speech frame and calculates secondary statistical values using the stored characteristics in order to classify the speech frame selected as the current object of determination as an non-voice sound or background noise. As described above, the speech signal classification system according to the present invention can use characteristics extracted from at least one speech frame in order to classify the speech frame selected as the current object of determination as an non-voice sound or background noise. If the speech signal classification system stores characteristics of more than two speech frames in order to perform recognition of the determination-reserved speech frame, the speech signal classification system can calculate secondary statistical values on the basis of the stored characteristics of more than two speech frames and the characteristics of the determination-reserved speech frame. In this case, a statistical value of the characteristics of each speech frame, such as a mean, a variance, or a standard deviation of the characteristics of each speech frame, can be used as a secondary statistical value.

The controller 200 performs secondary recognition by providing the secondary statistical values calculated in the above-described process and a determination result of the speech frame according to the primary recognition to the secondary recognition unit 206. The secondary recognition is a process of receiving the secondary statistical values and the primary recognition result, weighting the secondary statistical values and the primary recognition result, and calculating each calculation element. The controller 200 determines, based on the calculated secondary recognition result, whether the speech frame selected as the current object of determination is an non-voice sound or background noise, and outputs the speech frame as an non-voice sound or background noise according to the determination result.

In order to increase the recognition accuracy of the speech frame selected as the current object of determination, the controller 200 can reuse the secondary recognition result as an input of the secondary recognition by feeding back the secondary recognition result. In this case, the controller 200 performs the secondary recognition using the calculated secondary statistical values and the primary recognition result, and determines, according to the secondary recognition result, whether the speech frame selected as the current object of determination is an non-voice sound or background noise. The controller 200 performs the secondary recognition again by providing the determination result, the secondary statistical values, and the primary recognition result to the secondary recognition unit 206. The secondary recognition unit 206 calculates a second secondary recognition result by weighing the determination result according to the first secondary recognition separate from weights granted to the determination result according to the primary recognition result and the secondary statistical values, and computing the primary recognition result, the first secondary recognition result, and the secondary statistical values. The controller 200 determines, based on the second secondary recognition result, whether the speech frame selected as the current object of determination is an non-voice sound or background noise, and outputs the speech frame selected as the current object of determination as an non-voice sound or background noise according to the determination result.

The memory unit 202 connected to the controller 200 stores various programs data for processing and controlling of the controller 200. If a determination result according to the primary recognition of a specific speech frame is input from the controller 200, the memory unit 202 stores the input determination result. The controller 200 controls the memory unit 202 to store characteristic information extracted from a speech frame selected as an object of determination and store characteristic information extracted from a pre-set number of speech frames on the basis of a speech frame. If a determination result according to the secondary recognition of the specific speech frame is input from the controller 200, the memory unit 202 also stores the input determination result. The speech frame selected as the object of determination is a speech frame set by the controller 200 as the object of determination to be performed using the secondary recognition from among speech frames that are determination-reserved according to a primary recognition result recognized that a relevant speech frame is not a voice sound.

The storage space of the memory unit 202 in which a primary recognition result and a determination result of the secondary recognition are stored is a determination result storage unit 218, and a storage space of the memory unit the in which characteristic information extracted from the speech frame selected as an object of determination and characteristic information extracted from a pre-set number of speech frames according to control of the controller 200 are stored on the basis of speech frame is the speech frame characteristic information storage unit 216.

The primary recognition unit 204 connected to the controller 200 can be comprised of a neural network. If characteristics of a speech frame are input from the controller 200, the primary recognition unit 204 performs an operation similar to the recognition unit 104 of the conventional speech signal classification system, i.e., weighs the characteristics of the speech frame, calculates a recognition result, and outputs the calculation result to the controller 200.

If characteristic information extracted from at least one speech frame under the control of the controller 200 is input, the secondary statistical value calculator 212 calculates secondary statistical values using the input characteristic information. The secondary statistical values are calculated in a basis of the types of the characteristic information. The secondary statistical value calculator 212 outputs the calculated secondary statistical values of the characteristic information to the controller 200.

The secondary recognition unit 206, which can also be comprised of a neural network, calculates each calculation element by receiving the secondary statistical values and the determination result according to the primary recognition as input values, and grants pre-set weights to the input values, and outputs the calculation result to the controller 200. If the controller 200 inserts the determination result according to the secondary recognition into the input values, the secondary recognition unit 206 calculates a secondary recognition result by granting a pre-set weight to the determination result according to the secondary recognition and calculation of the calculation elements and outputs the calculation result to the controller 200. The classification & output unit 214 outputs the input speech frame as a voice sound, an non-voice sound, or background noise according to the determination result of the controller 200.

Figure 3:
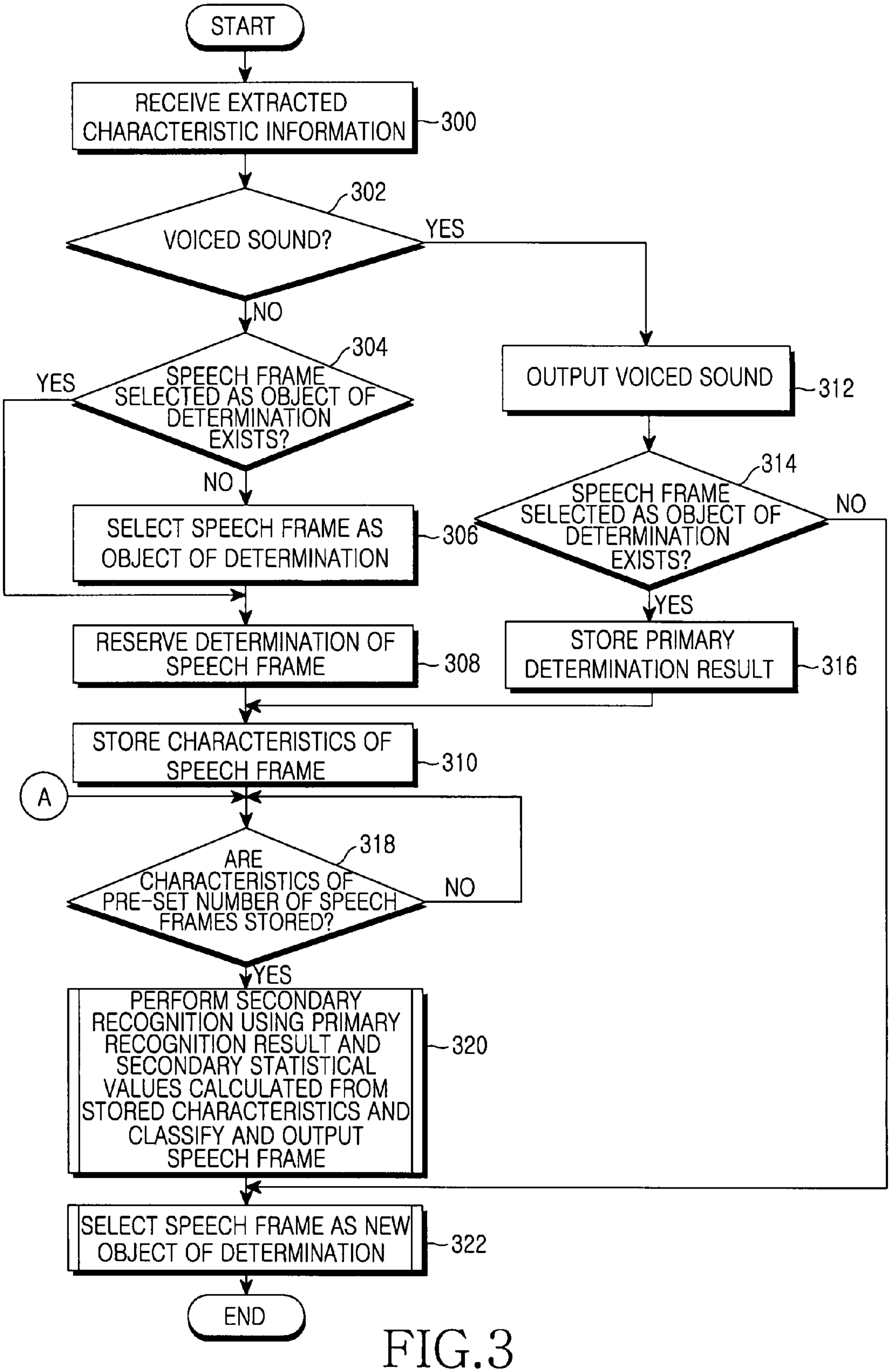
FIG. 3 is a flowchart illustrating a speech signal classification method in which a speech signal classification system recognizes a speech signal and classifies and outputs the speech signal according to the recognition result, according to the present invention.

FIG. 3 is a flowchart illustrating a speech signal classification method in which the speech signal classification system illustrated in FIG. 2 recognizes a speech signal and classifies and outputs the speech signal according to the recognition result, according to the present invention.

In the speech signal classification system according to the present invention, the speech frame input unit 208 generates a speech frame by transforming an input speech signal to a speech signal in the frequency domain and outputs the generated speech frame to the characteristic extractor 210. The characteristic extractor 210 extracts characteristic information from the input speech frame and outputs the extracted characteristic information to the controller 200.

If the extracted characteristic information of the speech frame is input from the characteristic extractor 210, the controller 200 receives the characteristic information of the speech frame in step 300. The controller 200 provides the received characteristic information of the speech frame to the primary recognition unit 204 and receives a calculated primary recognition result from the primary recognition unit 204. The controller 200 determines in step 302 if a determination result according to the primary recognition result corresponds to a voice sound. If it is determined in step 302 that the determination result does not correspond to a voice sound, the controller 200 determines in step 304 if a speech frame selected as an object of determination exists.

If a speech frame is determined as an non-voice sound or background noise, determination of the speech frame is reserved, and after characteristic information is extracted from at least one other speech frame, secondary recognition is performed using secondary statistical values calculated using the characteristic information extracted from the speech frame and the characteristic information extracted from the other speech frames. If a speech frame selected as an object of determination exists, characteristic information of at least one speech frame input next to the speech frame selected as the object of determination is extracted and stored regardless of whether the at least one speech frame is a voice sound, an non-voice sound, or background noise. The stored characteristic information of the at least one speech frame is used for determining the speech frame selected as the object of determination. If a speech frame selected as an object of determination exists, the characteristic information of the currently input speech frame is stored for the determination of the speech frame selected as the object of determination, and if a speech frame selected as the object of determination does not exist, the currently input speech frame is selected as an object of determination. The speech frame selected as the object of determination is a determination-reserved speech frame, i.e., a speech frame which has not been determined as a voice sound according to the primary recognition and selected as the object to be determined as an non-voice sound or background noise through the secondary recognition.

If it is determined in step 302 that the currently input speech frame is not a voice sound, the controller 200 determines in step 304 if a speech frame selected as the object of determination exists. If it is determined in step 304 that a speech frame selected as the object of determination does not exist, the controller 200 selects the currently input speech frame as the object of determination in step 306 and reserves determination of the currently input speech frame in step 308. If it is determined in step 304 that a speech frame selected as the object of determination exists, the controller 200 reserves determination of the currently input speech frame in step 308 without performing step 306. The controller 200 stores the characteristic information of the determination-reserved speech frame in step 310.

If it is determined in step 302 that the currently input speech frame is a voice sound, the controller 200 controls the classification and output unit 214 to output the currently input speech frame as a voice sound in step 312. The controller 200 determines whether to store characteristic information of the speech frame determined as a voice sound, if a speech frame selected as an object of determination currently exists. As described above, this is because the speech frame determined as a voice sound must be used to perform the secondary recognition of the speech frame selected as the object of determination regardless of whether the currently input speech frame is a voice sound, an non-voice sound, or background noise if the speech frame selected as the object of determination exists. Even though the controller 200 determined and output the currently input speech frame as a voice sound in steps 302 and 312, the controller 200 determines in step 314 if a speech frame selected as the object of determination currently exists.

If it is determined in step 314 that a speech frame selected as the object of determination does not exist, the controller 200 ends this process. If it is determined in step 314 that a speech frame selected as the object of determination currently exists, the controller 200 stores the determination result according to the primary recognition result, i.e., the determination result corresponding to a voice sound, in the determination result storage unit 218 as a determination result of the input speech frame in step 316. Thereafter, the controller 200 stores characteristic information of the input speech frame in step 310. In this case, both the characteristic information of the speech frame selected as the object of determination and the characteristic information of the speech frame that is not selected as the object of the determination are stored in the memory unit 202 regardless of whether the speech frames are voice sounds.

The controller 200 determines in step 318 if characteristic information of a pre-set number of speech frames is stored, wherein the pre-set number is the number of speech frames needed to calculate secondary statistical values required for the secondary recognition of the speech frame selected as the object of determination. If it is determined in step 318 that characteristic information of speech frames corresponding to the pre-set number is stored, the controller 200 calculates secondary statistical values from the stored characteristic information of the speech frames in step 320. The controller 200 also controls the secondary recognition unit 206 to perform the secondary recognition using the calculated secondary statistical values and the determination result according to the primary recognition result of the speech frame selected as the object of determination and determines, using the secondary recognition result calculated by the secondary recognition unit 206, if the speech frame selected as the object of determination is an non-voice sound or background noise.

Alternatively, if the secondary recognition is performed again using the secondary recognition result calculated by the secondary recognition unit 206, the controller 200 sets the secondary recognition result of the speech frame selected as the object of determination as an input value of the second secondary recognition. In this case, input values of the second secondary recognition of the speech frame selected as the object of determination are the determination result according to the secondary recognition, the determination result according to the primary recognition, and the secondary statistical values. The secondary recognition unit 206 grants pre-set weights to the input values, performs the secondary recognition again, and finally determines, according to the second secondary recognition result, if the speech frame selected as the object of determination is an non-voice sound or background noise.

When the speech frame selected as the current object of determination is classified and output as an non-voice sound or background noise according to the secondary recognition result in step 320, the controller 200 selects a speech frame to be a new object of determination from among speech frames corresponding to currently stored characteristic information in step 322. The controller 200 selects one of the speech frames corresponding to the currently stored characteristic information, which has been determination-reserved as the primary recognition result, i.e., has not been determined as a voice sound, as the speech frame to be the new object of determination. An operation of the controller 200 to select the speech frame to be the new object of determination in step 322 will now be described with reference to FIG. 4.

Figure 4:
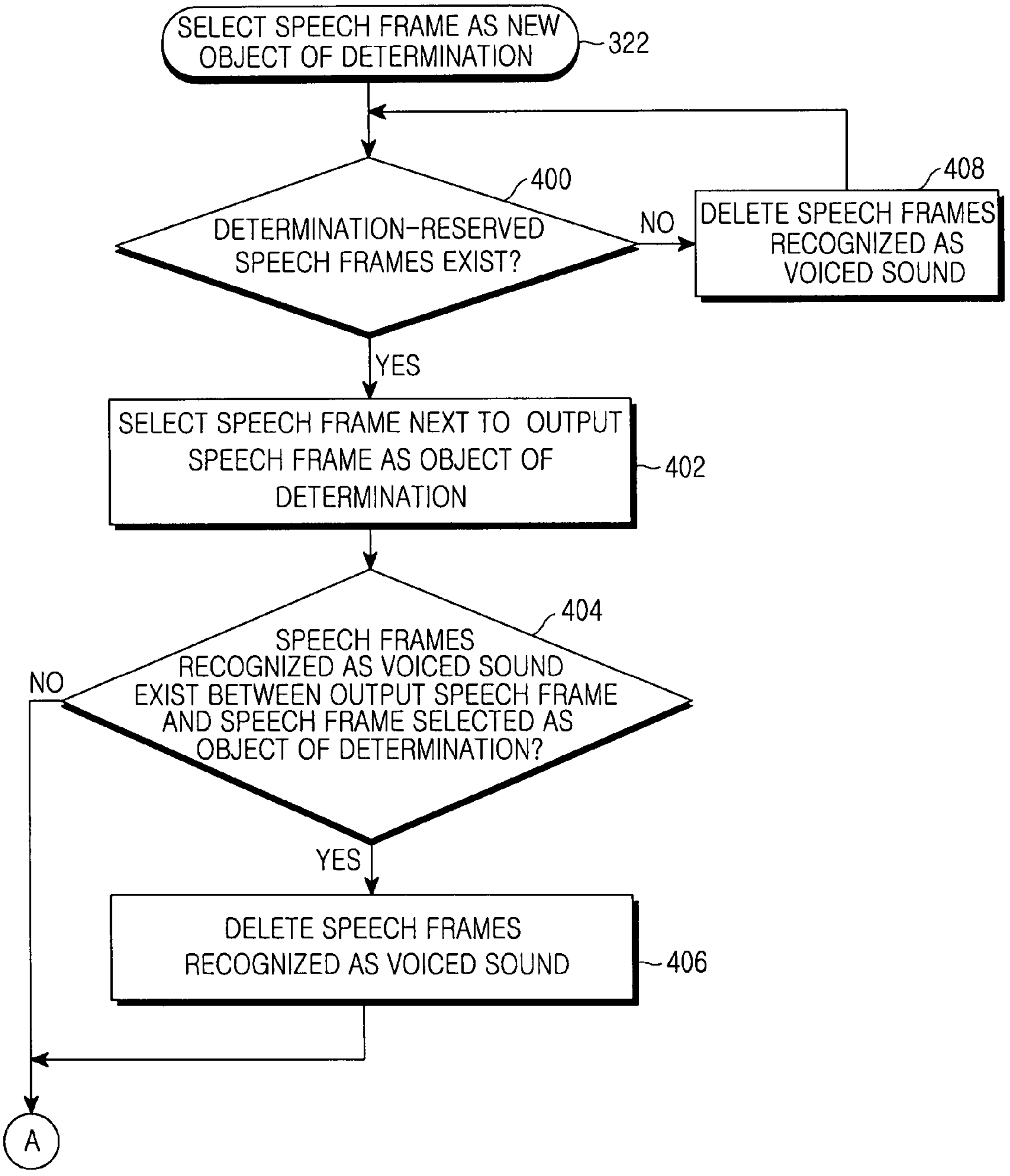
FIG. 4 is a flowchart illustrating a process of selecting one of speech frames corresponding to stored characteristic information as a new object of determination in a speech signal classification system according to the present invention.

FIG. 4 is a flowchart illustrating a process of selecting one of speech frames corresponding to stored characteristic information as a new object of determination in the speech signal classification system illustrated in FIG. 2, according the present invention.

Referring to FIG. 4, the controller 200 determines in step 400 if a speech frame, which has been determination-reserved as a primary recognition result, i.e., has not been determined as a voice sound, exists among speech frames corresponding to characteristic information stored in the memory unit 202. If it is determined in step 400 that a speech frame, which has not been determined as a voice sound according to the primary recognition result, does not exist among the speech frames corresponding to the stored characteristic information, i.e., if it is determined in step 400 that all of the speech frames corresponding to the stored characteristic information have been determined as a voice sound according to the primary recognition result, the controller 200 deletes the characteristic information of the speech frames recognized as a voice sound in step 408. Thereafter, the controller 200 determines in step 400 if a speech frame, which has not been determined as a voice sound according to the primary recognition result.

If it is determined in step 400 that a speech frame, which has not been determined as a voice sound according to the primary recognition result, exists among the speech frames corresponding to the stored characteristic information, the controller 200 selects a speech frame next to the speech frame of which the secondary recognition result is output in step 320 illustrated in FIG. 3 from among the speech frames corresponding to the stored characteristic information as a current object of determination in step 402. The controller 200 determines in step 404 if speech frames recognized as a voice sound according to the primary recognition result exist between the speech frame of which the secondary recognition result is output and the speech frame selected as the current object of determination. If it is determined in step 404 that speech frames recognized as a voice sound according to the primary recognition result exist between the speech frame of which the secondary recognition result is output and the speech frame selected as the current object of determination, the controller 200 deletes characteristic information of the speech frames recognized as a voice sound from among the stored characteristic information in step 406. If it is determined in step 404 that no speech frame recognized as a voice sound according to the primary recognition result exists between the speech frame of which the secondary recognition result is output and the speech frame selected as the current object of determination, the controller 200 determines in step 318 illustrated in FIG. 3 if characteristic information of a pre-set number of speech frames required for the secondary recognition of the speech frame selected as the current object of determination is stored. In step 320 illustrated in FIG. 3, the controller 200 performs the secondary recognition of the speech frame selected as the current object of determination and finally determines according to the secondary recognition result whether the speech frame selected as the current object of determination is a non-voice sound or background noise.

FIGS. 5A, 5B, 5C and 5D illustrate characteristic information of speech frames, which is stored to perform recognition of a speech frame selected as a current object of determination in the speech signal classification system illustrated in FIG. 2, according to a preferred embodiment of the present invention. Frame numbers illustrated in these figures denote an input sequence of characteristic information of speech frames, which have been determination-reserved or have been recognized as a voice sound according to the primary recognition result. That is, in FIG. 5A, a frame 1 denotes characteristic information of a speech frame, which has been input and stored prior to a frame 2.

Referring to FIGS. 5A to 5D, it is assumed in FIG. 5A that the number of speech frames required for the second recognition of a speech frame selected as a current object of determination, i.e., the pre-set number in step 318 illustrated in FIG. 3, is 1, and it is assumed in FIGS. 5B to 5D that the pre-set number in step 318 illustrated in FIG. 3 is 4.

Referring to FIG. 5A, if a speech frame selected as an object of determination exists, only characteristic information of another speech frame is stored in the memory unit 202, and secondary statistical values are calculated on the basis of characteristics using characteristic information of the speech frame selected as the current object of determination and the characteristic information of the other speech frame. The secondary recognition is performed by setting the calculated secondary statistical values and a determination result according to a primary recognition result of the speech frame selected as the current object of determination as input values. The second secondary recognition may be performed using the values set as the input values and a determination result according to the secondary recognition result. The speech frame selected as the current object of determination is output as an non-voice sound or background noise according to the secondary recognition result or the second secondary recognition result.

Referring to FIG. 5B, since the pre-set number is 4, if a speech frame selected as a current object of determination exists, the controller 200 waits until characteristic information of 4 speech frames is stored (referring to step 318 illustrated in FIG. 3). If the characteristic information of the 4 speech frames are stored, the controller 200 calculates secondary statistical values on the basis of characteristics from characteristic information of the speech frame selected as the current object of determination and the stored characteristic information of the 4 speech frames and performs the secondary recognition by setting the calculated secondary statistical values and a determination result according to a primary recognition result of the speech frame selected as the current object of determination as input values. The controller 200 may perform the second secondary recognition using the values set as the input values and a determination result according to the secondary recognition result. The speech frame selected as the current object of determination is output as an non-voice sound or background noise according to the secondary recognition result or the second secondary recognition result.

FIG. 5C illustrates a case where the characteristic information of the speech frame selected as the current object of determination has been deleted after the speech frame selected as the current object of determination was classified and output as an non-voice sound or background noise.

The controller 200 determines if characteristic information of a speech frame, which has been determination-reserved as a primary recognition result, i.e., has been determined as an non-voice sound or background noise, exists among currently stored characteristic information (referring to step 400 illustrated in FIG. 4). The controller 200 determines if characteristic information of speech frames recognized as a voice sound is stored between the characteristic information of the output speech frame and the characteristic information of the speech frame selected as a new object of determination (referring to step 404 illustrated in FIG. 4) and deletes the characteristic information of the speech frames recognized as a voice sound according to determination result (referring to step 406 illustrated in FIG. 4). Characteristic information of speech frames, which is stored in frames 2 and 3 illustrated in FIG. 5C, is deleted, and characteristic information of a speech frame, which is stored in a frame 4 illustrated in FIG. 5C, is selected as a speech frame to be a new object of determination. The controller 200 stores characteristic information of speech frames corresponding to the pre-set number (referring to step 318 illustrated in FIG. 3).

FIG. 5D illustrates the characteristic information of the speech frames, which is stored in the speech frame characteristic information storage unit 216 of the memory unit 202

Figure 6:
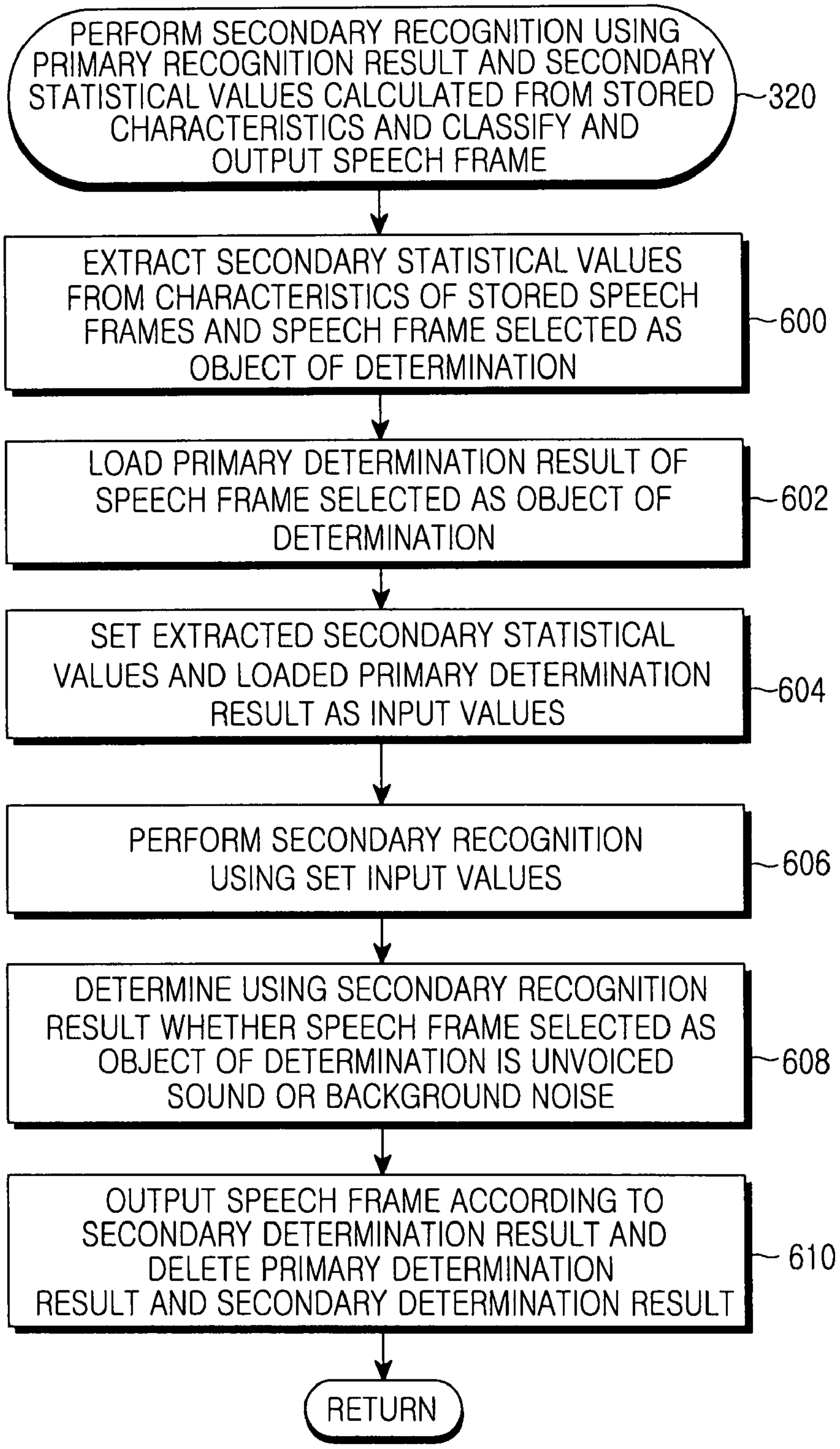
FIG. 6 is a flowchart illustrating a secondary recognition process of a speech frame selected as a current object of determination in a speech signal classification system according to the present invention.

FIG. 6 is a flowchart illustrating a process of performing the secondary recognition by setting secondary statistical values, which are calculated using characteristic information of a speech frame selected as a current object of determination, and a determination result according to a primary recognition result of the speech frame selected as the current object of determination as input values, and finally determining, based on the secondary recognition result if the speech frame selected as the current object of determination is an non-voice sound or background noise, in the speech signal classification system illustrated in FIG. 2, according to the present invention.

Referring to FIG. 6, if it is determined in step 318 illustrated in FIG. 3 that characteristic information of speech frames corresponding to the pre-set number is stored, the controller 200 controls the secondary statistical value calculator 212 to calculate secondary statistical values from the characteristic information of the speech frame selected as the current object of determination and the stored characteristic information of the speech frames in step 600. The secondary statistical values can be calculated on a one to one basis with the characteristic information. For example, if the characteristics extracted by the characteristic extractor 210 are a periodic characteristic of harmonics, RMSE of a low band speech signal, and a ZC, the secondary statistical values are calculated on the basis of the characteristics using periodic characteristics of harmonics, RMSE values, and ZC values, which are extracted from the speech frame selected as the current object of determination and the speech frames corresponding to the stored characteristic information.

The controller 200 loads a determination result (a primary determination result) according to the primary recognition of the speech frame selected as the current object of determination in step 602. The controller 200 sets the calculated secondary statistical values and the primary determination result as input values in step 604. The controller 200 performs the secondary recognition of the speech frame selected as the current object of determination using the set input values in step 606.

The secondary recognition is performed by the secondary recognition unit 206, which can be realized with a neural network. In the secondary recognition, a calculation result of each calculation step is obtained according to weights granted to the input values, and a calculation result of whether the speech frame selected as the current object of determination is close to an non-voice sound or background noise is derived after a last calculation step. The controller 200 determines (a secondary determination result) in step 608, based on the derived calculation result, i.e., the secondary recognition result, if the speech frame selected as the current object of determination is an non-voice sound or background noise. The controller 200 outputs the speech frame selected as the current object of determination according to the secondary determination result and deletes the primary determination result and the secondary determination result of the output speech frame in step 610. The controller 200 selects a speech frame to be a new object of determination from among speech frames corresponding to currently stored characteristic information in step 322 illustrated in FIG. 3.

Figure 7:
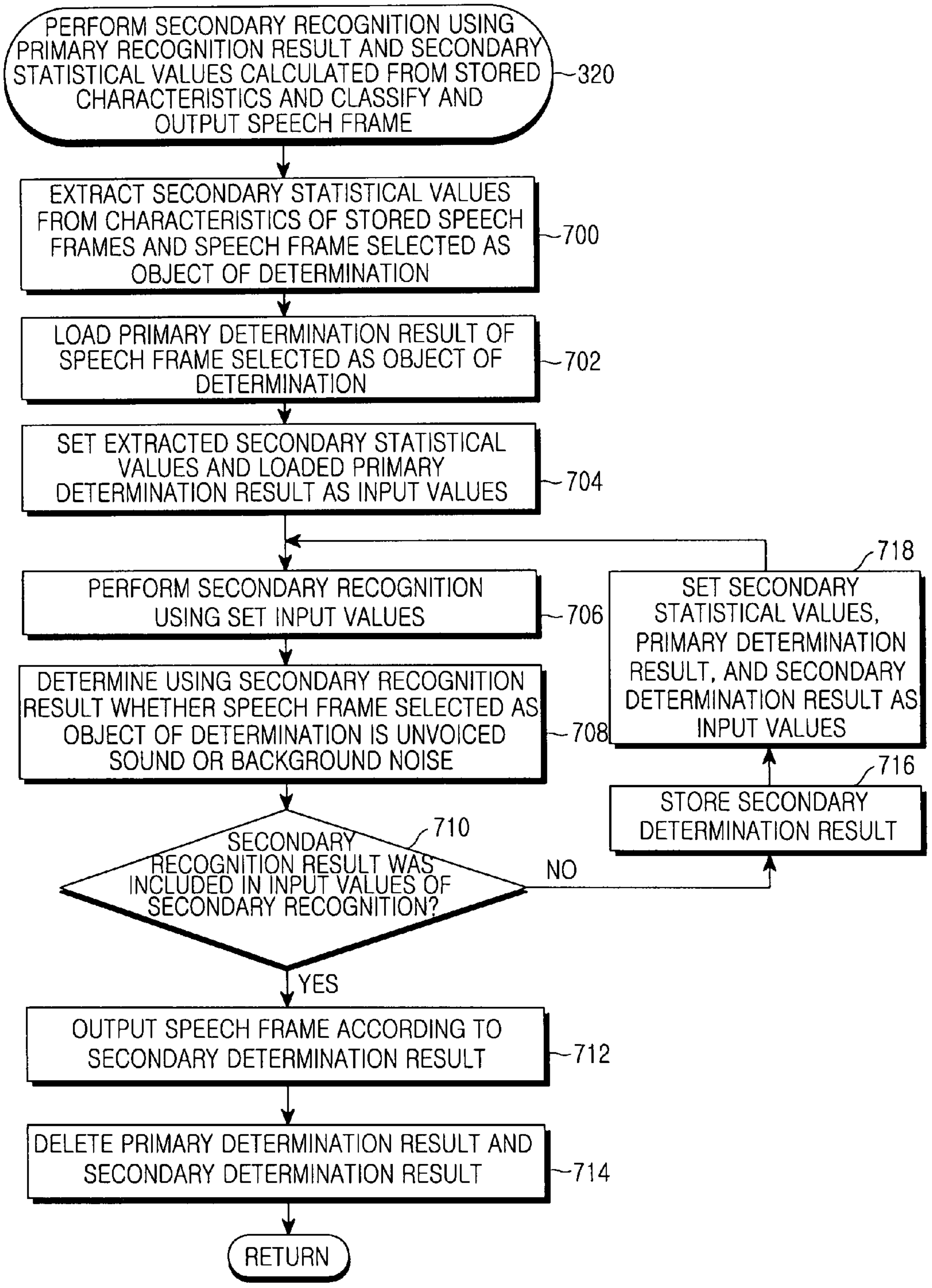
FIG. 7 is a flowchart illustrating a secondary recognition process of a speech frame selected as a current object of determination in a speech signal classification system according to the present invention.

FIG. 7 is a flowchart illustrating a process of performing second secondary recognition of a speech frame selected as a current object of determination by setting a secondary determination result of the speech frame selected as the current object of determination as an input value of the secondary recognition unit 206 in the speech signal classification system illustrated in FIG. 2, according to the present invention.

Referring to FIG. 7, if it is determined in step 318 illustrated in FIG. 3 that characteristic information of speech frames corresponding to the pre-set number are stored, the controller 200 controls the secondary statistical value calculator 212 to calculate secondary statistical values from the characteristic information of the speech frame selected as the current object of determination and the stored characteristic information of the speech frames in step 700. The controller 200 loads a determination result (a primary determination result) according to the primary recognition of the speech frame selected as the current object of determination in step 702.

The controller 200 sets the calculated secondary statistical values and the primary determination result as input values of the secondary recognition unit 206 in step 704. The controller 200 performs the secondary recognition of the speech frame selected as the current object of determination by providing the set input values to the secondary recognition unit 206 in step 706. The controller 200 determines (a secondary determination result) in step 708 using the secondary recognition result if the speech frame selected as the current object of determination is an non-voice sound or background noise. The controller 200 determines in step 710 if the secondary determination result of the speech frame selected as the current object of determination was included in the input values of the secondary recognition unit 206.

If it is determined in step 710 that the secondary determination result of the speech frame selected as the current object of determination is not stored, the controller 200 stores the secondary determination result of the speech frame selected as the current object of determination in step 716. The controller 200 sets the secondary statistical values, the primary determination result, and the secondary determination result of the speech frame selected as the current object of determination as input values of the secondary recognition unit 206 in step 718. The controller 200 performs the secondary recognition of the speech frame selected as the current object of determination by providing the currently set input values to the secondary recognition unit 206 in step 706. The controller 200 determines (a secondary determination result) again in step 708 using the second secondary recognition result if the speech frame selected as the current object of determination is an non-voice sound or background noise. The controller 200 determines again in step 710 if the secondary determination result of the speech frame selected as the current object of determination was included in the input values of the secondary recognition unit 206.

If it is determined in step 710 that the secondary determination result of the speech frame selected as the current object of determination was included in the input values of the secondary recognition unit 206, the controller 200 outputs the speech frame selected as the current object of determination according to the secondary determination result in step 712. The controller 200 deletes the primary determination result and the secondary determination result of the output speech frame in step 714.

The controller 200 selects a speech frame to be a new object of determination from among speech frames corresponding to currently stored characteristic information in step 322 illustrated in FIG. 3.

As described above, according to the present invention, by performing secondary recognition of a speech frame, which has been determined as an non-voice sound or background noise according to a primary recognition result, using at least one other speech frame, a determination can be made as to whether the speech frame is an non-voice sound or background noise. Thus, even a speech frame that is an non-voice sound, i.e., a speech frame in which a voiced characteristic such as periodic repetition of harmonics appears over a plurality of speech frames, can be detected. Accordingly, the speech frame that is an non-voice sound can be correctly distinguished from background noise.

Thus, a speech frame, which is not determined as a voice sound by a conventional speech signal classification system, can be more correctly classified and output as an non-voice sound or background noise.

While the invention has been shown and described with reference to a certain preferred embodiment thereof, it will be understood by those skilled in the art that various changes in form and details may be made therein without departing from the spirit and scope of the invention. For example, although a periodic characteristic of harmonics, RMSE, and a ZC are described as characteristic information of a speech frame, which is extracted by the characteristic extractor 210 in order to classify the speech frame as a voice sound, an non-voice sound, or background noise, in the present invention, the present invention is not limited to this. That is, if new characteristics, which can be more easily used to classify a speech frame than the described characteristics of a speech frame, exist, the new characteristics can be used in the present invention. In this case, if it is determined that a currently input speech frame is not a voice sound, the new characteristics are extracted from the currently input speech frame and at least one other speech frame, and secondary statistical values of the extracted new characteristics are calculated, and the calculated secondary statistical values can be used as input values for secondary recognition of the speech frame, which has not been determined as a voice sound. Thus it will be understood by those skilled in the art that various changes in form and details may be made therein without departing from the spirit and scope of the invention as defined by the appended claims.

What is claimed is:

1. A speech signal classification system, comprising:

a speech frame input unit for generating a speech frame by converting a speech signal of a time domain to a speech signal of a frequency domain;

a characteristic extractor for extracting characteristic information from the generated speech frame;

a primary recognition unit for performing primary recognition using the extracted characteristic information to derive a primary recognition result to be used to determine if the speech frame is a voice sound, an non-voice sound, or background noise;

a memory unit for storing characteristic information extracted from the speech frame and at least one other speech frame;

a secondary statistical value calculator for calculating secondary statistical values using the stored characteristic information;

a secondary recognition unit for performing secondary recognition using the determination result of the speech frame according to the primary recognition result and the secondary statistical values to derive a secondary recognition result to be used to determine if the speech frame is an non-voice sound or background noise;

a controller for determining if the speech frame is a voice sound based on the primary recognition result voice sound, and if it is determined that the speech frame is not a voice sound, storing the characteristic information of the speech frame and at least one other speech frame, calculating the secondary statistical values using the stored characteristic information, performing the secondary recognition using the determination result of the speech frame based on the primary recognition result and the secondary statistical values, and determining if the speech frame is an non-voice sound or background noise based on the secondary recognition result; and a classification and output unit for classifying and outputting the speech frame as a voice sound, an non-voice sound, or background noise according to the determination results.

2. The speech signal classification system of claim 1, wherein the primary recognition unit and the secondary recognition unit are comprised of a neural network.

3. The speech signal classification system of claim 1, wherein if a determination result according to the secondary recognition result is stored, the secondary recognition unit derives a secondary recognition result, which is used to determine whether the speech frame is an non-voice sound or background noise, using the determination result of the speech frame according to the primary recognition result, the determination result according to the secondary recognition result, and the secondary statistical values calculated based on the characteristic information.

4. The speech signal classification system of claim 3, wherein the controller determines according to the primary recognition result if the speech frame is a voice sound, and if it is determined that the speech frame is not a voice sound, stores the characteristic information of the speech frame and at least one other speech frame, calculates the secondary statistical values using the stored characteristic information, performs the secondary recognition using the determination result of the speech frame according to the primary recognition result and the secondary statistical values, determines according to the secondary recognition result whether the speech frame is an non-voice sound or background noise, stores the determination result according to the secondary recognition result, performs the secondary recognition again using the determination result according to the primary recognition result, the determination result according to the secondary recognition result, and the secondary statistical values, and determines according to the second secondary recognition result whether the speech frame is an non-voice sound or background noise.

5. The speech signal classification system of claim 1, wherein if the determination result of the speech frame according to the primary recognition result does not correspond to a voice sound, the controller extracts characteristic information from a pre-set number of speech frames input after the speech frame and stores the extracted characteristic information.

6. The speech signal classification system of claim 2, wherein if the determination result of the speech frame according to the primary recognition result does not correspond to a voice sound, the controller extracts characteristic information from a pre-set number of speech frames input after the speech frame and stores the extracted characteristic information.

7. The speech signal classification system of claim 3, wherein if the determination result of the speech frame according to the primary recognition result does not correspond to a voice sound, the controller extracts characteristic information from a pre-set number of speech frames input after the speech frame and stores the extracted characteristic information.

8. The speech signal classification system of claim 4, wherein if the determination result of the speech frame according to the primary recognition result does not correspond to a voice sound, the controller extracts characteristic information from a pre-set number of speech frames input after the speech frame and stores the extracted characteristic information.

9. The speech signal classification system of claim 5, wherein the controller calculates secondary statistical values based on characteristics using the characteristic information of the speech frame and the stored characteristic information of a pre-set number of speech frames.

10. The speech signal classification system of claim 5, wherein if the speech frame is classified and output as an non-voice sound or background noise, the controller selects one of the speech frames corresponding to the stored characteristic information, which has not been determined as a voice sound, as a new object of determination to be determined as an non-voice sound or background noise.

11. The speech signal classification system of claim 10, wherein the controller stores characteristic information of a pre-set number of other speech frames, calculates secondary statistical values using the stored characteristic information, performs the secondary recognition using the determination result according to the primary recognition result and the secondary statistical values, and determines according to the second secondary recognition result whether the speech frame selected as the new object of determination is an non-voice sound or background noise.

12. A method of classifying a speech signal in a speech signal classification system, that includes a speech frame input unit for generating a speech frame by converting the speech signal of a time domain to a speech signal of a frequency domain, a secondary statistical value calculator for calculating secondary statistical values using characteristic information extracted from the speech frame and at least one other speech frame, and a secondary recognition unit for performing secondary recognition using the secondary statistical values, the method comprising the steps of:

performing primary recognition using characteristic information extracted from a speech frame to determine whether the speech frame is a voice sound, an non-voice sound, or background noise;

if it is determined as a result of the primary recognition that the speech frame is not a voice sound, storing the determination result of the speech frame and characteristic information of the speech frame;

storing characteristic information extracted from a pre-set number of other speech frames;

calculating secondary statistical values based on the stored characteristic information of the speech frame and the other speech frames;

performing secondary recognition using the determination result of the speech frame according to the primary recognition result and the secondary statistical values to determine whether the speech frame is an non-voice sound or background noise; and classifying and outputting the speech frame as an non-voice sound or background noise according to a result of the secondary recognition.

13. The method of claim 12, wherein the step of performing secondary recognition comprises:

determining whether the speech frame is an non-voice sound or background noise using the determination result of the speech frame according to the primary recognition result and the secondary statistical values non-voice sound;

storing the secondary determination result;

performing the secondary recognition again using the determination result according to the primary recognition result, the secondary determination result, and the secondary statistical values; and determining according to the second secondary recognition result whether the speech frame is an non-voice sound or background noise.

14. The method of claim 12, further comprises after the speech frame is classified and output as an non-voice sound or background noise, selecting one of the speech frames corresponding to the stored characteristic information as a new object of determination.

15. The method of claim 14, wherein the step of selecting one of the speech frames comprises:

determining whether speech frames, which have not been determined as a voice sound exist among the speech frames corresponding to the stored characteristic information; and if it is determined that speech frames, which have not been determined as a voice sound exist, selecting a speech frame stored next to the classified and output speech frame as the new object of determination.

16. The method of claim 15, further comprises deleting the stored characteristic information if characteristic information of speech frames, which have been determined as a voice sound according to the primary recognition result, is stored between the characteristic information of the classified and output speech frame and characteristic information of the speech frame selected as the new object of determination.

17. The method of claim 14, wherein the step of storing characteristic information comprises storing characteristic information extracted from a pre-set number of speech frames different from the speech frame selected as the new object of determination, wherein the step of calculating secondary statistical values comprises calculating secondary statistical values based on characteristic information of the speech frame selected as the new object of determination and the stored characteristic information of the different speech frames, wherein the step of performing secondary recognition comprises determining using a determination result of the speech frame selected as the new object of determination according to the primary recognition result and the secondary statistical values whether the speech frame selected as the new object of determination is an non-voice sound or background noise, and wherein the step of classifying and outputting the speech frame comprises classifying and outputting the speech frame selected as the new object of determination as an non-voice sound or background noise according to a result of the secondary recognition.

18. The method of claim 17, wherein the step of performing secondary recognition comprises:

determining using a primary determination result and the secondary statistical values whether the speech frame selected as the new object of determination is an non-voice sound or background noise;

storing the determination result as a secondary determination result;

performing the secondary recognition again using the primary determination result, the secondary determination result, and the secondary statistical values; and determining whether the speech frame selected as the new object of determination is an non-voice sound or background noise.

* * * * *